(12) United States Patent
Ii (10) Patent No.: US 11,870,959 B2
(45) Date of Patent: Jan. 9, 2024

(54) IMAGE FORMING APPARATUS THAT INCLUDES COUNTER THAT STORES A COUNT VALUE FOR EACH SCAN OR PRINT SPEED

(71) Applicant: TOSHIBA TEC KABUSHIKI KAISHA, Tokyo (JP)

(72) Inventor: Motoki Ii, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 32 days.

(21) Appl. No.: 17/859,305

(22) Filed: Jul. 7, 2022

(65) Prior Publication Data
US 2023/0033283 A1    Feb. 2, 2023

(30) Foreign Application Priority Data

Aug. 2, 2021   (JP) .................. 2021-126663

(51) Int. Cl.
  *H04N 1/00*   (2006.01)
  *G06F 3/12*   (2006.01)
(52) U.S. Cl.
  CPC ....... *H04N 1/00822* (2013.01); *G06F 3/1215* (2013.01); *G06F 3/1253* (2013.01); *H04N 1/00384* (2013.01); *H04N 1/00811* (2013.01); *H04N 2201/0081* (2013.01); *H04N 2201/0094* (2013.01)

(58) Field of Classification Search
None
See application file for complete search history.

(56) References Cited

U.S. PATENT DOCUMENTS

| 2010/0241543 | A1 | 9/2010 | Matsumoto | |
|---|---|---|---|---|
| 2014/0104662 | A1* | 4/2014 | Sung | H04N 1/0476 358/498 |
| 2015/0055160 | A1 | 2/2015 | Ito | |
| 2016/0011553 | A1* | 1/2016 | Igarashi | G03G 15/5008 399/43 |

FOREIGN PATENT DOCUMENTS

| JP | 2005-085031 A | 3/2005 |
|---|---|---|
| JP | 2006-240103 A | 9/2006 |
| JP | 2007-241412 A | 9/2007 |

* cited by examiner

*Primary Examiner* — Andrew H Lam
(74) *Attorney, Agent, or Firm* — Kim & Stewart LLP (57) ABSTRACT

In accordance with an embodiment, an image reading apparatus sets a scan speed corresponding to an operating speed input by the operation panel. The image reading apparatus executes a scan job at the set scan speed. In addition, the image reading apparatus updates a scan counter in accordance with the number of pages of an image read at the set scan speed.

4 Claims, 9 Drawing Sheets

| Scanner counter | | | |
|---|---|---|---|
| FULL COLOR | | LARGE | SMALL |
| | COPY SCAN | 00000000 | 00000000 |
| | NET SCAN | 00000000 | 00000000 |
| TWIN COLOR | | LARGE | SMALL |
| | COPY SCAN | 00000000 | 00000000 |
| | NET SCAN | 00000000 | 00000000 |
| BLACK | | LARGE | SMALL |
| | COPY SCAN | 00000000 | 00000000 |
| | NET SCAN | 00000000 | 00000000 |
| 1.5X FULL COLOR | | LARGE | SMALL |
| | COPY SCAN | 00000000 | 00000000 |
| | NET SCAN | 00000000 | 00000000 |
| 1.5X TWIN COLOR | | LARGE | SMALL |
| | COPY SCAN | 00000000 | 00000000 |
| | NET SCAN | 00000000 | 00000000 |
| 1.5X BLACK | | LARGE | SMALL |
| | COPY SCAN | 00000000 | 00000000 |
| | NET SCAN | 00000000 | 00000000 |
| 2X FULL COLOR | | LARGE | SMALL |
| | COPY SCAN | 00000000 | 00000000 |
| | NET SCAN | 00000000 | 00000000 |
| 2X TWIN COLOR | | LARGE | SMALL |
| | COPY SCAN | 00000000 | 00000000 |
| | NET SCAN | 00000000 | 00000000 |
| 2X BLACK | | LARGE | SMALL |
| | COPY SCAN | 00000000 | 00000000 |
| | NET SCAN | 00000000 | 00000000 |

Fig.4

| Print counter | | | |
|---|---|---|---|
| FULL COLOR | | LARGE | SMALL |
| | COPY | 00000000 | 00000000 |
| | PRINT | 00000000 | 00000000 |

~ 5421

| TWIN COLOR | | LARGE | SMALL |
|---|---|---|---|
| | COPY | 00000000 | 00000000 |
| | PRINT | 00000000 | 00000000 |

~ 5422

| BLACK | | LARGE | SMALL |
|---|---|---|---|
| | COPY | 00000000 | 00000000 |
| | PRINT | 00000000 | 00000000 |

~ 5423

| 1.5X FULL COLOR | | LARGE | SMALL |
|---|---|---|---|
| | COPY | 00000000 | 00000000 |
| | PRINT | 00000000 | 00000000 |

~ 5424

| 1.5X TWIN COLOR | | LARGE | SMALL |
|---|---|---|---|
| | COPY | 00000000 | 00000000 |
| | PRINT | 00000000 | 00000000 |

~ 5425

| 1.5X BLACK | | LARGE | SMALL |
|---|---|---|---|
| | COPY | 00000000 | 00000000 |
| | PRINT | 00000000 | 00000000 |

~ 5426

| 2X FULL COLOR | | LARGE | SMALL |
|---|---|---|---|
| | COPY | 00000000 | 00000000 |
| | PRINT | 00000000 | 00000000 |

~ 5427

| 2X TWIN COLOR | | LARGE | SMALL |
|---|---|---|---|
| | COPY | 00000000 | 00000000 |
| | PRINT | 00000000 | 00000000 |

~ 5428

| 2X BLACK | | LARGE | SMALL |
|---|---|---|---|
| | COPY | 00000000 | 00000000 |
| | PRINT | 00000000 | 00000000 |

IMAGE FORMING APPARATUS THAT INCLUDES COUNTER THAT STORES A COUNT VALUE FOR EACH SCAN OR PRINT SPEED

CROSS-REFERENCE TO RELATED APPLICATION

This application is based upon and claims the benefit of priority from the prior Japanese Patent Application No. 2021-126663, filed on Aug. 2, 2021, the entire contents of which are incorporated herein by reference.

FIELD

An embodiment described here generally relates to an image reading apparatus and an image forming apparatus.

BACKGROUND

Conventionally, image reading apparatuses such as scanners mounted on digital multifunction peripherals operate at a scan speed and a processing speed that are set in factories or at the time of setting up. In the conventional image reading apparatuses, the scan speed and the processing speed that have been set before users use them cannot be changed. Normally, the scan speed and the processing speed are often reflected to the price of the image forming apparatus. Therefore, users who focus on the costs have to buy low-speed machines and users who focus on the processing speed have to buy high-speed machines.

However, in actual operation, image reading apparatuses such as scanners provided in digital multifunction peripherals can be used with no problem in low-speed processing focusing on the costs, but high-speed processing is sometimes required. Conventional image reading apparatuses cannot realize operation to perform low-speed scan processing in default settings so as to reduce the costs and to temporarily increase the costs so as to perform high-speed scan processing. In recent years, improvement of the productivity of the scan processing of the image reading apparatus such as the scanner provided in the digital multifunction peripheral has been focused along with increasing paperless demands. Therefore, it is desirable to provide an image reading apparatus and a system that are capable of performing scan processing according to a user's request and improving the productivity of a scanner.

DETAILED DESCRIPTION

In accordance with one embodiment, an image reading apparatus includes a scanner, an operation panel, a storage device, and a processor. The scanner reads an image of a document at a set scan speed. The operation panel inputs an operating speed of a scan job using the scanner. The storage device includes a scan counter that stores, for each scan speed, a count value of the number of pages of the image read by using the scanner. The processor sets a scan speed corresponding to the operating speed input by the operation panel. The processor executes the scan job at the set scan speed. In addition, the processor updates the scan counter in accordance with the number of pages of the image read at the set scan speed.

Figure 1:
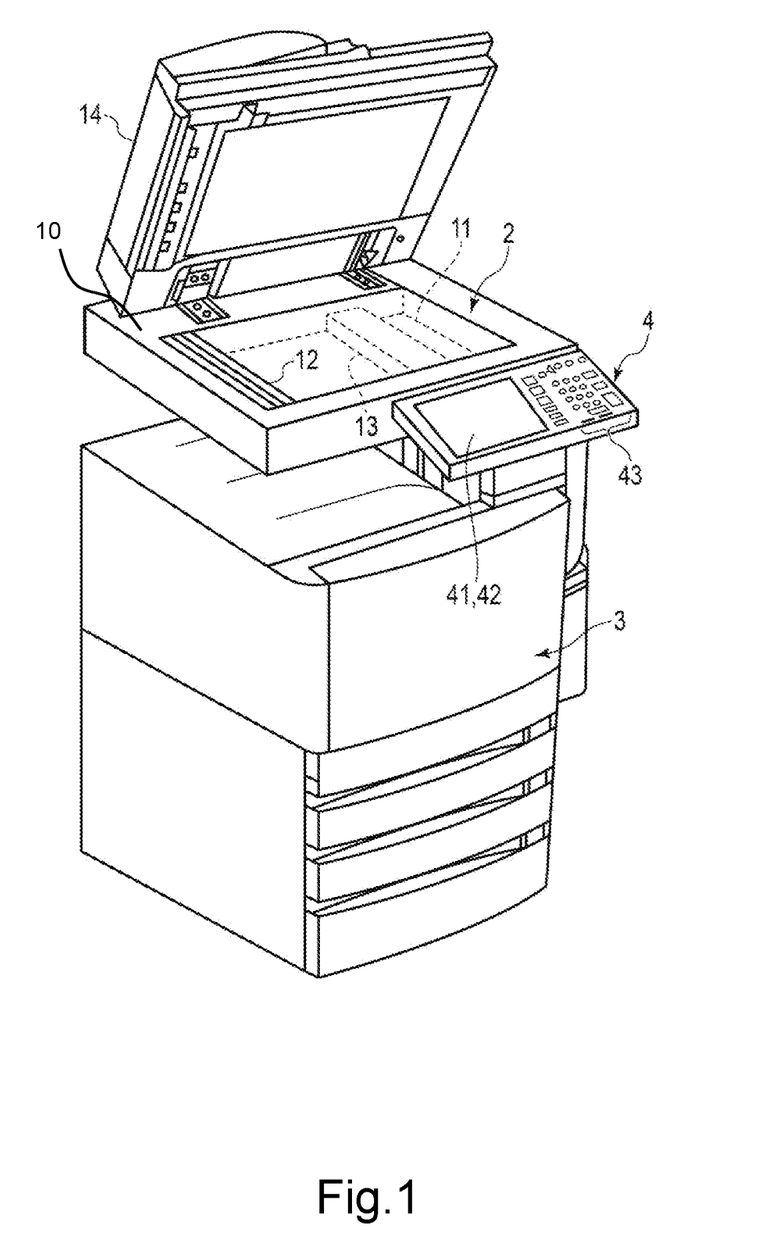
FIG. 1 is a perspective view showing the outer appearance of a digital multifunction peripheral serving as an image reading apparatus and an image forming apparatus according to an embodiment.
Figure 2:
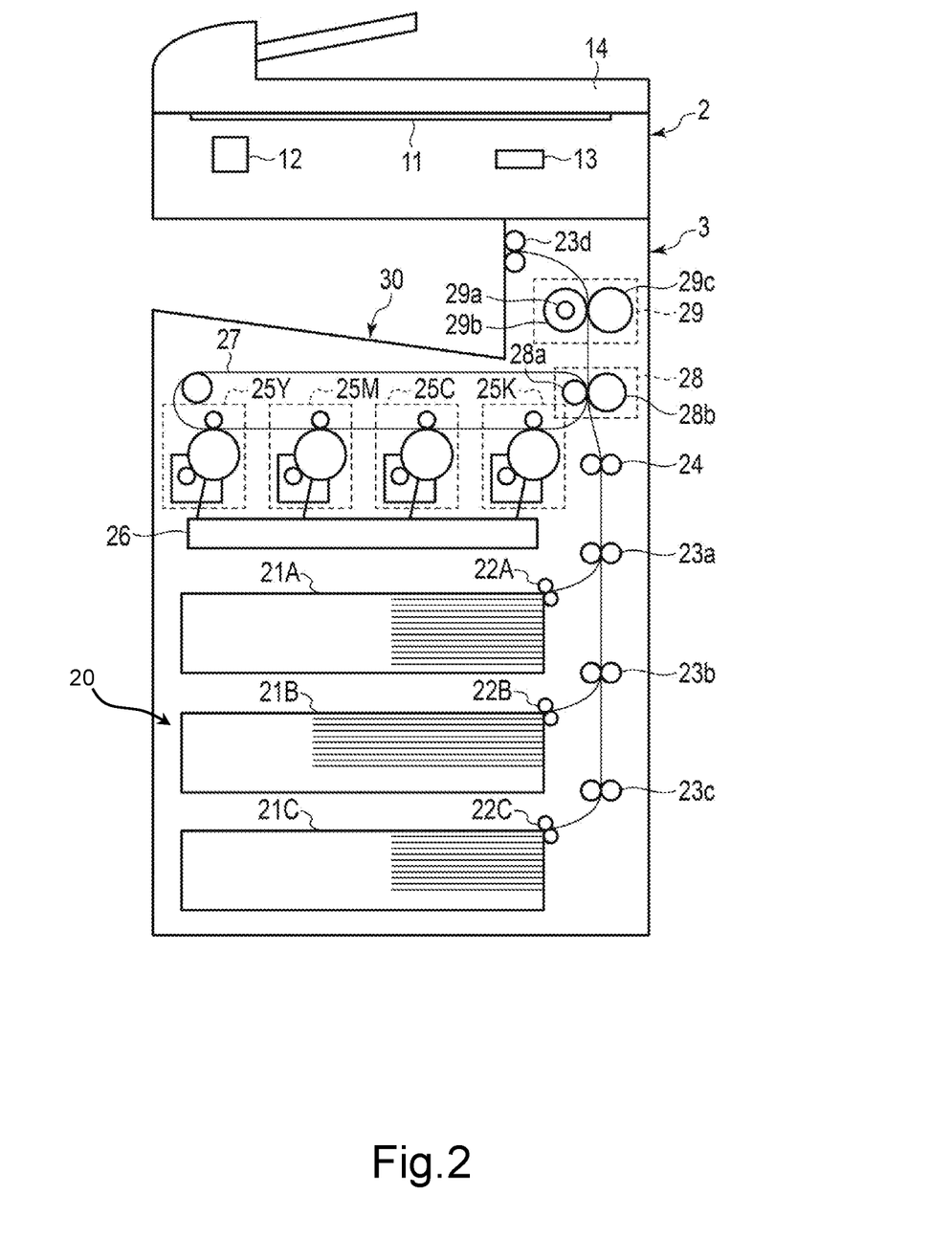
FIG. 2 is a cross-sectional view showing the digital multifunction peripheral serving as the image reading apparatus and the image forming apparatus according to the embodiment.

Hereinafter, this embodiment will be described with reference to the drawings. In the drawings, the same reference signs denote the same or similar portions. First of all, a configuration of a digital multifunction peripheral (MFP) 1 serving as an image forming apparatus according to the embodiment will be described. FIG. 1 is a perspective view showing the outer appearance of the digital multifunction peripheral 1 serving as the image forming apparatus according to the embodiment. Moreover, FIG. 2 is a cross-sectional view showing the digital multifunction peripheral 1.

As shown in FIG. 1, the digital multifunction peripheral 1 has a scanner 2, a printer 3, and an operation panel 4. The scanner 2 is installed in a main body upper portion of the digital multifunction peripheral. The scanner 2 is an apparatus that optically reads an image of a document. The scanner 2 has a document table glass 11 on which a document to be scanned is placed. The scanner 2 has an image reading mechanism that scans the document on the document table glass 11 through the document table glass 11.

The scanner 2 has a carriage 12, a photoelectric conversion device 13, and the like. The carriage 12, the photoelectric conversion device 13, and the like are installed below the document table glass 11. The carriage 12 includes an optical system such as an illumination device 62 (see FIG. 3) and a mirror. The illumination device 62 is installed in the carriage 12 so that a reading position on the document table glass 11 is illuminated with light to be emitted. The reading position on the document table glass 11, to which the illumination device 62 emits light, becomes an image for one or more lines in a main scanning direction. The optical system such as the mirror mounted on the carriage 12 guides light (reflected light) from the reading position, to which the illumination device 62 emits the light, to the photoelectric conversion device 13.

Moreover, the carriage 12 is moved in a sub-scanning direction below the document table glass 11 through a moving mechanism 63 (see FIG. 3) including a stepping motor and the like. The position of the carriage 12 is determined in an initial operation and the movement of the carriage 12 in the sub-scanning direction is controlled on the basis of the determined position. For example, the carriage 12 is moved in the sub-scanning direction, thereby continuously guiding images respectively corresponding to lines in the main scanning direction in a region (document reading region) in which the document on the document table glass 11 is placed to the photoelectric conversion device 13.

The photoelectric conversion device 13 has a lens, a photoelectric conversion sensor, a cover, and the like. The lens collects light guided by the optical system of the carriage 12 and guides the light to the photoelectric conversion sensor. The photoelectric conversion sensor includes photoelectric conversion elements. The photoelectric conversion sensor is, for example, a line sensor in which CCDs or CISs serving as the photoelectric conversion elements are arranged in a line form. The line sensor serving as the photoelectric conversion sensor converts an image for one line (reflected light on the document surface) in the main scanning direction into pixel data for one line.

The carriage 12 moved by the moving mechanism 63 moves the reading position on the document table glass 11 in the sub-scanning direction. The scanner 2 reads the entire image of the document by acquiring image data in the main scanning direction through the photoelectric conversion device 13 while moving the carriage 12 in the sub-scanning direction. The scanner 2 controls the reading speed of the image in the sub-scanning direction by controlling the movement of the carriage 12. Moreover, in accordance with the movement speed of the carriage 12, the scanner 2 controls the timing for acquiring the pixel data for one line in the main scanning direction from the line sensor. Accordingly, the scanner 2 controls the reading speed (scan speed) of the entire image of the document set on the document table glass 11.

The scanner 2 has an auto document feeder (ADF) 14. Hereinafter, the auto document feeder 14 will be abbreviated as the ADF 14. The ADF 14 also functions as a document table cover and is installed on a document table 10 so as to be capable of being opened and closed. When the ADF 14 is closed, the ADF 14 covers the entire document reading region on the document table glass 11. Moreover, the ADF 14 includes a sheet feeding tray, a transport system, and the like. The sheet feeding tray of the ADF 14 retains a document that is a reading target. The transport system of the ADF 14 takes out a document set on the sheet feeding tray one by one and conveys the document so that a reading surface of the taken-out document passes through a predetermined reading position.

The scanner 2 controls the reading speed of the image in the sub-scanning direction by controlling the transport speed at which the ADF 14 transports the document. Moreover, in accordance with the document transport speed of the ADF 14, the scanner 2 controls the timing for acquiring the pixel data for one line in the main scanning direction from the line sensor. Accordingly, the scanner 2 controls the reading speed (scan speed) of the entire image of the document set in the ADF 14.

The printer 3 has a sheet feeding mechanism 20. The sheet feeding mechanism 20 includes sheet feeding cassettes 21A, 21B, 21C and sheet feeding rollers 22A, 22B, 22C. The sheet feeding cassettes 21A, 21B, 21C house paper sheets serving as image-formed media on which images are to be printed. For example, each of the sheet feeding cassettes 21A, 21B, 21C is capable of being attached and detached to/from a lower portion of the main body of the digital multifunction peripheral. The sheet feeding cassettes 21A, 21B, 21C have the sheet feeding rollers 22A, 22B, 22C, respectively. The sheet feeding rollers 22A, 22B, 22C are provided in association with the sheet feeding cassettes 21A, 21B, 21C, respectively. The paper sheets are taken out from each of the sheet feeding cassettes 21A, 21B, 21C one by one.

A conveying mechanism 23 conveys the paper sheets in the printer 3. The conveying mechanism 23 includes a plurality of transport rollers 23a to 23d, a resistance roller 24, and the like. The conveying mechanism 23 conveys a paper sheet taken out by each of the sheet feeding rollers 22A, 22B, 22C to the resistance roller 24. The resistance roller 24 conveys the paper sheet to a secondary transfer position to be described later at an image transfer timing.

A plurality of image forming devices 25 (25Y, 25M, 25C, 25K) forms images in colors (yellow, magenta, cyan, black) respectively. The light exposure device 26 forms electrostatic latent images serving as images developed in the colors on image carriers in the image forming devices 25 (25Y, 25M, 25C, 25K) respectively. The light exposure device 26 forms the electrostatic latent images on the image carriers by scanning the image carriers with light emitted in accordance with the image data. For example, the light exposure device 26 emits light emitted from a light-emitting portion to photosensitive drums serving as the image carriers via rotated polygon mirrors, thereby scanning them in the main scanning direction. Moreover, rotation of the photosensitive drums moves the position to which the light exposure device 26 emits light in the sub-scanning direction. That is, the positions and scales of images formed by the image forming devices 25 are adjusted by controlling the light exposure device 26.

The image forming devices 25 (25Y, 25M, 25C, 25K) develop electrostatic latent images on the image carriers with toners in colors (yellow, magenta, cyan, black), respectively. An intermediate transfer belt 27 is an intermediate transfer member. The image forming devices 25 transfer (primarily transfer) toner images in the respective colors developed with the respective color toners in the image carriers to the intermediate transfer belt 27.

The intermediate transfer belt 27 retains the transferred toner images and transports the transfer toner images to the secondary transfer position. The secondary transfer position is a position where the toner images on the intermediate transfer belt 27 are transferred to a paper sheet. The secondary transfer position is a position where a support roller 28a and a secondary transfer roller 28b face each other. The support roller 28a and the secondary transfer roller 28b constitute a transfer device 28. The resistance roller 24 conveys the paper sheet to the secondary transfer position in synchronization with the toner image on the intermediate transfer belt 27. The transfer device 28 transfers the toner images retained on the intermediate transfer belt 27 to the paper sheet at the secondary transfer position.

For example, for forming a color image, the image forming devices 25Y, 25M, 25C, and 25K transfer toner images developed with toners in colors (yellow, magenta, cyan, black) respectively, superimposed on the intermediate transfer belt 27. The intermediate transfer belt 27 retains the color image in which the color toner images overlap. The transfer device 28 transfers the color image with the multicolor toners on the intermediate transfer belt 27 to the paper sheet at the secondary transfer position. The resistance roller 24 conveys the paper sheet to the secondary transfer position in synchronization with the toner image on the intermediate transfer belt 27. Accordingly, the color image is transferred to the paper sheet.

The transfer device 28 supplies a fixing device 29 with the paper sheet to which the toner images are transferred. The fixing device 29 fixes the toner images on the paper sheet. The fixing device 29 has a heater 29a, a heat roller 29b, and a press roller 29c. The heater 29a heats the heat roller 29b. The heat roller 29b and the press roller 29c perform fixation in which the paper sheet to which the toner images are transferred by the transfer device 28 is heated in a pressed state. The heat roller 29b and the press roller 29c in the fixing device 29 transports the fixed paper sheet to a transport roller 23d. The transport roller 23d conveys the paper sheet from the fixing device 29 to a sheet delivery portion 30.

The operation panel 4 is a user interface. The operation panel 4 displays a guide and receives an input via an operation button or icon. For example, a user inputs setting information in the operation panel 4. The operation panel 4 has a display device (display) 41, a touch panel 42, and a plurality of operation buttons 43. For example, the touch panel 42 is provided on a display screen of a display device 41. The touch panel 42 detects a point on the display screen of the display device 41, which is touched by the user.

Figure 3:
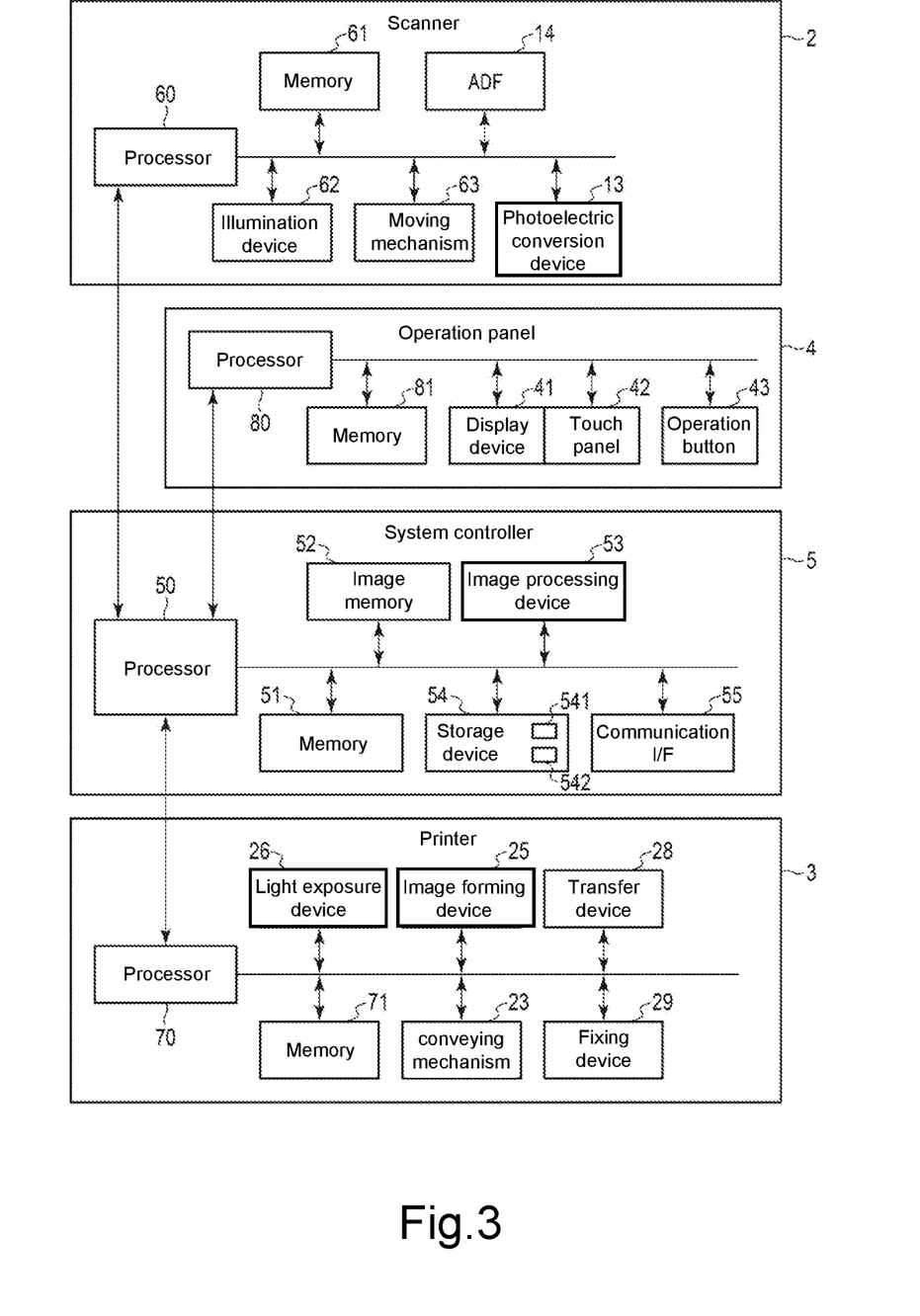
FIG. 3 is a block diagram showing a configuration example of a control system in the digital multifunction peripheral serving as the image reading apparatus and the image forming apparatus according to the embodiment.

Next, a configuration of a control system in the digital multifunction peripheral configured in the above-mentioned manner will be described. FIG. 3 is a block diagram showing a configuration example of the control system in the digital multifunction peripheral 1. The digital multifunction peripheral 1 has a system controller 5 that controls the entire apparatus. The system controller 5 connects the scanner 2, the printer 3, and the operation panel 4. In the configuration example shown in FIG. 3, the system controller 5 has a processor 50, a memory 51, an image memory 52, an image processing device 53, a storage device 54, a communication interface (I/F) 55, and the like.

The processor 50 connects to a processor 60 of the scanner 2, a processor 70 of the printer 3, and a processor of the operation panel 4 via an interface. The processor realizes various processing function by executing a program stored in the memory 51 or the storage device 54. For example, the processor 50 outputs operation instructions to the respective blocks or processes various types of information from the respective blocks by executing a program stored in the memory 51.

The memory 51 includes a memory such as a random access memory (RAM), a read only memory (ROM), and a non-volatile memory (NVM). The RAM functions as a working memory or a buffer memory. The ROM is an non-rewritable nonvolatile memory. The ROM functions as a program memory. The NVM is a rewritable nonvolatile memory. The NVM stores a setting data and the like. The image memory 52 stores image data. For example, the image memory 52 functions as a page memory for expanding image data that is a processing target.

The image processing device 53 processes image data. The image processing device 53 outputs image data obtained by performing image processing such as correction, compression, and extension on input image data, for example. Moreover, the image processing device 53 includes a processor for image processing. It is assumed that the operating frequency (operating speed) of the processor for image processing in the image processing device 53 is variable. The image processing device 53 changes the processing time related to the image processing by changing the operating frequency of the processor. For example, the image processing device 53 is capable of setting the processing time of the image processing to a 1.5 times or twice processing speed by increasing the operating frequency of the processor.

The storage device 54 stores data such as control data, a control program, and setting information. The storage device 54 includes a rewritable nonvolatile memory. For example, the storage device 54 is configured as a storage device such as a hard disk drive (HDD) and a solid state drive (SSD).

Moreover, the storage device 54 has a scan counter 541 and a print counter 542. The scan counter 541 counts the number of pages scanned through the scanner 2. In a digital multifunction peripheral serving as the image reading apparatus according to this embodiment, the scan counter 541 counts the number of scanned pages for each scan speed. The print counter 542 counts the number of pages printed through the printer 3. In the digital multifunction peripheral 1 serving as the image forming apparatus according to this embodiment, the print counter 542 counts the number of pages printed at each print speed.

The communication I/F 55 is an interface for performing data communication with an external apparatus. For example, the communication I/F 55 is an interface for communicating with the external apparatus serving as an output destination to which an image scanned through a network scan function is output. Moreover, the communication I/F 55 is an interface for receiving an image for print and a print instruction from the external apparatus through a network print function. Moreover, the communication I/F 55 includes an interface for sending to a fax sending destination fax data generated from an image scanned through a fax function. Moreover, the communication I/F 55 may be an interface for communicating with the external apparatus (e.g., server) that collects values and the like of the scan counter 541 and the print counter 542.

Next, a configuration example of the control system in the scanner 2 will be described. As shown in FIG. 3, the scanner 2 has the processor 60, a memory 61, the ADF 14, the illumination device 62, the moving mechanism 63, and the photoelectric conversion device 13. The processor 60 realizes various types of processing by executing a program stored in the memory 61. For example, the processor 60 controls operations of the respective blocks in the scanner 2 and monitors operation statuses of the respective blocks by executing the program. Moreover, the processor 60 is connected to the processor 50 of the system controller 5 via the interface. The processor 60 executes a scan operation of reading an image of a document in accordance with an operation instruction from the system controller 5.

The memory 61 includes a memory such as a random access memory (RAM), a read only memory (ROM), and a data memory. The RAM functions as a working memory or a buffer memory. The ROM is an non-rewritable nonvolatile memory. The ROM functions as a program memory. The data memory is a rewritable nonvolatile memory. The ADF 14 has a pick-up roller and a conveying mechanism as configurations of the control system. The processor 60 drives the pick-up roller and the conveying mechanism to convey a document to the reading position one by one.

The illumination device 62 is mounted on the carriage 12 and emits light to the reading position on the document table glass 11. The illumination device 62 has a light source that emits light in accordance with a light-up instruction from the processor 60. The light source is not limited to a particular configuration. Light emitted by the illumination device 62 becomes light reflected from a document placed on the document table glass 11 and enters the photoelectric conversion device 13 via the optical system such as the mirror and the lens.

The moving mechanism 63 is a mechanism that moves the carriage 12. The moving mechanism 63 has the stepping motor serving as a driving source and the like. The moving mechanism 63 moves the carriage 12 by driving of the stepping motor. The moving mechanism 63 moves the carriage 12 in accordance with the processor 60 or the processor 50 of the operation instruction from the system controller 5. For example, for scanning a document on the document table glass 11, the processor 60 moves the carriage 12 in the sub-scanning direction (FWD direction) from a reading start position.

In accordance with an operation instruction from the processor 50, the processor 60 changes the movement speed of the carriage 12 by the moving mechanism 63. For example, in a case where a scan speed 1.5 times a default setting value is designated, the moving mechanism 63 moves the carriage 12 at the speed 1.5 times the default value. Moreover, in a case where a scan speed twice the default setting value is designated, the moving mechanism 63 moves the carriage 12 at the speed twice the default value.

The photoelectric conversion device 13 includes the photoelectric conversion sensor including the photoelectric conversion elements that convert incident light into electrical signals. The photoelectric conversion device 13 has the line sensor constituted by the photoelectric conversion sensor that generates pixel data for a reading line in the main scanning direction, for example. Moreover, the photoelectric conversion device 13 also has a lens and the like for inputting light guided by the optical system mounted on the carriage 12 into the photoelectric conversion sensor. That is, the photoelectric conversion sensor of the photoelectric conversion device 13 outputs the pixel data for the reading line in the main scanning direction in order in accordance with movement of the carriage 12 in the sub-scanning direction.

Moreover, the photoelectric conversion device 13 controls the output timing of the pixel data in accordance with the movement speed of the carriage 12 and the resolution. For example, in a case where the movement speed of the carriage 12 (scan speed) is twice the default value, the photoelectric conversion device 13 outputs the pixel data at the timing twice the timing that is the default value. Moreover, in a case where the document transport speed (scan speed) of the ADF 14 is twice the default value, the photoelectric conversion device 13 outputs the pixel data at the timing twice the timing that is the default value.

Next, a configuration example of a control system in the printer 3 will be described. As shown in FIG. 3, the printer 3 has the processor 70, a memory 71, the conveying mechanism 23, the image forming devices 25, the light exposure device 26, the transfer device 28, the fixing device 29, and the like. The processor 70 realizes various types of processing by executing a program stored in the memory 71. For example, the processor 70 controls operations of the respective blocks in the printer 3 and monitors operation statuses of the respective blocks by executing the program. Moreover, the processor 70 is connected to the processor 50 of the system controller 5 via the interface. The processor 70 executes print processing and the like in accordance with the operation instruction from the system controller 5.

The memory 71 includes a memory such as a random access memory (RAM), a read only memory (ROM), and a data memory. The RAM functions as a working memory or a buffer memory. The ROM is an non-rewritable nonvolatile memory. The ROM functions as a program memory. The data memory is a rewritable nonvolatile memory. The conveying mechanism 23 conveys a paper sheet in the printer 3 under the control of the processor 70. That is, the conveying mechanism 23 conveys the paper sheet by driving the transport rollers of the respective blocks in accordance with an operation instruction from the processor 70.

In accordance with an operation instruction from the processor 70, the light exposure device 26 emits light (laser light) for forming electrostatic latent images on the respective photosensitive drums of the image forming devices 25. The processor 70 adjusts a printing position, a scale, and the like by controlling the positions on the photosensitive drums to which the light exposure device 26 emits the laser light. The processor 70 executes image adjustment to obtain a desired printing range under the operation control depending on the printing range, using a printing base as the start point.

In accordance with an operation instruction from the processor 70, the image forming devices 25 develop the electrostatic latent images formed on the photosensitive drums with the respective color toners. Moreover, the image forming devices 25 transfer (primarily transfer) the toner images formed on the photosensitive drums to the intermediate transfer belt.

In accordance with an operation instruction from the processor 70, the transfer device 28 transfers (secondarily transfers) the toner images transferred to the intermediate transfer belt 27 to the paper sheet. In accordance with an operation instruction from the processor 70, the fixing device 29 drives the heat roller 29b and the press roller 29c. Moreover, under the control of the processor 70, the heater 29a of the fixing device 29 increases the surface temperature of the heat roller 29b to a desired fixation temperature. In the state controlled at the fixation temperature, the fixing device 29 fixes the toner images transferred to the paper sheet on the paper sheet.

Moreover, in accordance with an operation instruction from the processor 50, the processor 70 changes the speed (print speed) of a print operation performed by the respective blocks in the printer 3. For example, in a case where a print speed 1.5 times a default setting value is designated, the processor 70 executes the print operation performed by the respective blocks at the speed 1.5 times the default value. Moreover, in a case where a print speed twice the default setting value is designated, the processor 70 executes the print operation performed by the respective blocks in the printer 3 at the speed twice the default value.

Next, a configuration example of a control system in the operation panel 4 will be described. As shown in FIG. 3, the operation panel 4 has the processor 80, a memory 81, the display device (display) 41, the touch panel 42, the operation buttons 43, and the like. The processor 80 realizes various types of processing by executing a program stored in the memory 81. For example, the processor 80 controls operations of the respective blocks in the operation panel 4 and monitors operation statuses of the respective blocks by executing the program. Moreover, the processor 80 is connected to the processor 50 of the system controller 5 via the interface. For example, the processor 80 notifies the system controller 5 of information input by the user.

The memory 81 includes a memory such as a random access memory (RAM), a read only memory (ROM), and a data memory. The RAM functions as a working memory or a buffer memory. The ROM is an non-rewritable nonvolatile memory. The ROM functions as a program memory. The data memory is a rewritable nonvolatile memory.

In accordance with an operation instruction from the processor 80, the display contents of the display device 41 are controlled. The touch panel 42 is provided on the display screen of the display device 41 and detects a touched position on the display screen. For example, the processor 80 displays on the display screen of the display device 41 icons, which can be selected on the touch panel 42, together with an operation guide. In accordance with a touch position detected through the touch panel 42, the processor 80 identifies information input by the user. The operation buttons 43 include hardware keys such as a start key and a reset key and the like.

Next, the operating speed in the image reading apparatus and the digital multifunction peripheral 1 serving as the image forming apparatus according to the embodiment will be described. The digital multifunction peripheral 1 according to this embodiment is manufactured as the apparatus having the hardware configurations shown in FIGS. 1 to 3 in a manufacture factory. For the digital multifunction peripheral 1, various default setting values (default values) are set in a working process (manufacturing process) at the manufacture factory. For the digital multifunction peripheral 1, the default value is set for a processing speed (scan speed) of a scan operation using the scanner 2. Moreover, in the digital multifunction peripheral 1, the default value is set for a processing speed (print speed) of a print operation using the printer 3. The digital multifunction peripheral 1 is capable of varying the scan speed and the print speed that are set as the default values during the operation (while the user uses the digital multifunction peripheral 1).

For example, in the digital multifunction peripheral 1, a scan speed lower than a maximum scan speed that can be achieved through the scanner 2 is set as the default value of the scan speed is set. Accordingly, the digital multifunction peripheral 1 is capable of setting the scan speed to be higher than the default value in accordance with the user's instruction or the like while the user uses the digital multifunction peripheral 1 (after the digital multifunction peripheral 1 is shipped from the manufacture factory). Moreover, in the digital multifunction peripheral 1, a print speed lower than a maximum print speed that can be achieved through the printer 3 is set as the default value of the print speed. Accordingly, the digital multifunction peripheral 1 is capable of setting the scan speed to be higher than the default value in accordance with the user's instruction or the like while the user uses the digital multifunction peripheral 1 (after the digital multifunction peripheral 1 is shipped from the manufacture factory).

The digital multifunction peripheral 1 has the scan counter 541 and the print counter 542. The scan counter 541 counts the number of scans (the number of pages of read images) for each scan speed. Moreover, the scan counter 541 may count the number of scans for each combination of the scan speed and the scan mode. The print counter 542 counts the number of prints (the number of pages of printed images) for each print speed. Moreover, the print counter 542 may count the number of prints for each combination of the print speed and the print mode.

The value counted by the scan counter 541 and the value counted by the print counter 542 are read out as appropriate. For example, the value of the scan counter 541 and the value of the print counter 542 are used for charging a price for the use depending on the scan operation and the print operation. The value of the scan counter 541 and the value of the print counter 542 may be capable of being acquired by the external apparatus that connects and communicates with the scan counter 541 and the print counter 542 via the communication interface 55. Moreover, the value of the scan counter 541 and the value of the print counter 542 may be read from the digital multifunction peripheral 1 by a serviceman.

Figure 4:
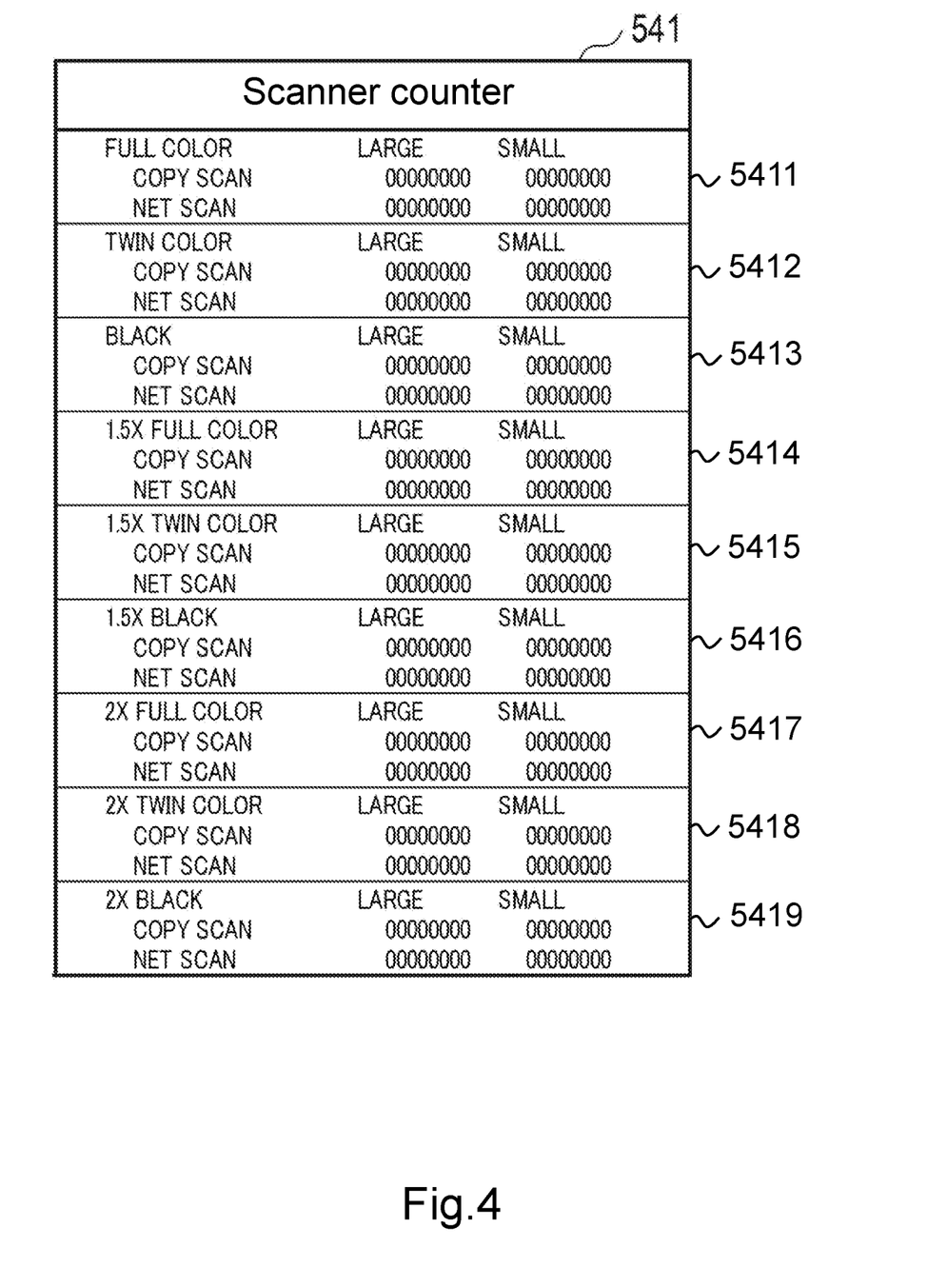
FIG. 4 is a diagram showing a scan counter provided in the digital multifunction peripheral serving as the image reading apparatus according to the embodiment.

Next, configuration examples of the scan counter 541 and the print counter 542 of the image reading apparatus and the digital multifunction peripheral 1 serving as the image forming apparatus according to the embodiment will be described. FIG. 4 is a diagram showing a configuration example of the scan counter 541 provided in the storage device 54 of the digital multifunction peripheral 1 according to the embodiment. In the configuration example shown in FIG. 4, the scan counter 541 counts the number of pages of scanned document images (hereinafter, the number of scans) for each scan mode and each scan speed. Moreover, the scan counter 541 shown in FIG. 4 counts the number of pages obtained by scanning images with a large size (e.g., a size larger than A4) and the number of pages obtained by scanning images with a small size (e.g., a size equal to or smaller than A4).

In the scan counter 541 shown in FIG. 4, the scan mode includes "full color", "twin color", and "black". Moreover, in the scan counter 541 shown in FIG. 4, the scan speed includes "default value (same scale)", "1.5 times (1.5×)", and "twice (2×)". In addition, in the scan counter 541 shown in FIG. 4, the operation mode includes copy processing (copy scan job) and individual scan processing (network scan job).

The scan counter 541 has scan counters 5411, 5412, 5413 associated with the scan mode that is the default value in order to count and store the number of scans the scan speed of which is the "default value (same scale)" for each scan mode and each operation mode. For example, the scan counter 5411 counts and stores the number of scans in the copy processing by the "full color" scan the scan speed of which is the default value (same scale speed) and the number of scans in the network scan (individual scan) by the "full color" scan the scan speed of which is the default value (same scale). Moreover, the scan counter 5412 counts and stores the number of scans in the copy processing by the "twin color" scan the scan speed of which is the same scale speed and the number of scans in the network scan by the "twin color" scan the scan speed of which is the same scale. Moreover, the scan counter 5413 counts and stores the number of scans in the copy processing by the "black" scan the scan speed of which is the same scale speed and the number of scans in the network scan by the "black" scan the scan speed of which is the same scale.

In addition, the scan counter 541 has scan counters 5414, 5415, 5416 associated with the scan mode of "1.5×" in order to count and store the number of scans the scan speed of which is "1.5×" for each scan mode and each operation mode. For example, the scan counter 5414 counts and stores the number of scans in the copy processing by the "full color" scan the scan speed of which is "1.5×" and the number of scans in the network scan by the "full color" scan the scan speed of which is "1.5×". Moreover, the scan counter 5415 counts and stores the number of scans the scan speed of which is "1.5×" in the copy processing by the "twin color" scan and the number of scans the scan speed of which is "1.5×" in the network scan by the "twin color" scan. Moreover, the scan counter 5416 counts and stores the number of scans the scan speed of which is "1.5×" in the copy processing by the "black" scan and the number of scans the scan speed of which is "1.5×" in the network scan by the "black" scan.

In addition, the scan counter 541 includes scan counters 5417, 5418, 5419 associated with the scan mode of the "2×" in order to count and store the number of scans performed at the scan speed that is "twice" the default value for each scan mode and each operation mode. For example, the scan counter 5417 counts and stores the number of scans in the copy processing by the "full color" scan the scan speed of which is "2×" and the number of scans in the network scan by the "full color" scan the scan speed of which is "2×". Moreover, the scan counter 5418 counts and stores the number of scans in the copy processing by the "twin color" scan the scan speed of which is "2×" and the number of scans in the network scan by the "twin color" scan the scan speed of which is "2×". Moreover, the scan counter 5419 counts and stores the number of scans in the copy processing by the "black" scan the scan speed of which is "2×" and the number of scans in the network scan by the "black" scan the scan speed of which is "2×".

In accordance with the scan counter 541 as shown in FIG. 4, the number of scans at each scan speed can be counted. Moreover, in accordance with the scan counter 541, the number of scans at each scan speed can also be counted for each scan mode. Moreover, in accordance with the scan counter 541, the number of scans in the copy processing and the number of scans in the network scan can also be counted for scan speed. In addition, in accordance with the scan counter 541, the number of scans corresponding to the size of the scanned image can also be counted.

Figure 5:
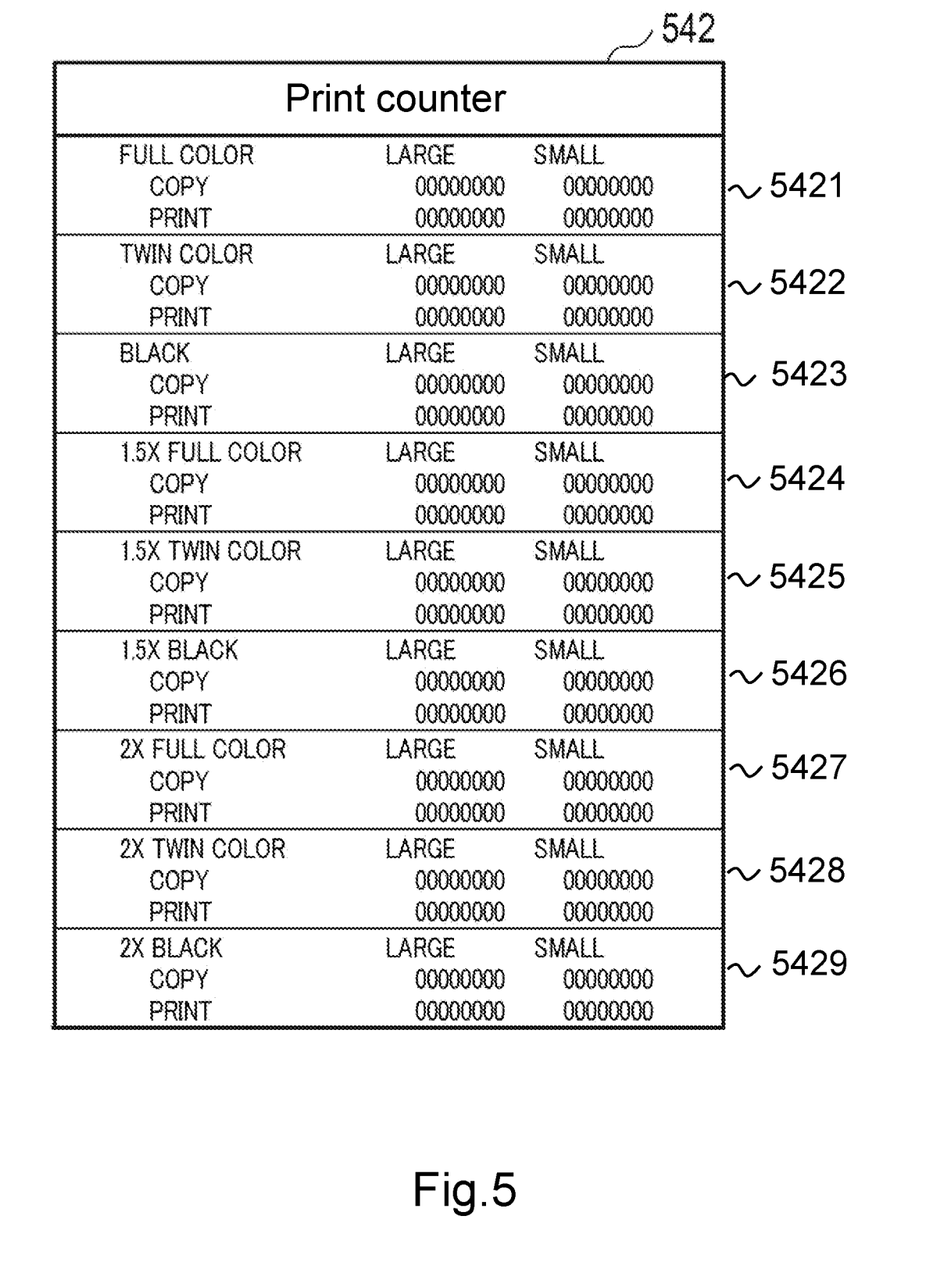
FIG. 5 is a diagram showing a print counter provided in the digital multifunction peripheral serving as the image forming apparatus according to the embodiment.

FIG. 5 is a diagram showing a configuration example of the print counter 542 provided in the storage device 54 of the digital multifunction peripheral 1 according to the embodiment. In the configuration example shown in FIG. 5, the print counter 542 counts the number of printed pages (hereinafter, the number of prints) for each print mode and each print speed. Moreover, the print counter 542 shown in FIG. 5 counts the number of pages obtained by printing images with a large size (e.g., a size larger than A4) and the number of pages obtained by printing images with a small size (e.g., a size equal to or smaller than A4).

In the print counter 542 shown in FIG. 5, the print speed includes "default value (same scale)", "1.5 times (1.5×)", and "twice (2×)". Moreover, in the print counter 542 shown in FIG. 5, the print mode includes "full color", "twin color", and "black". In addition, in the print counter 542 shown in FIG. 5, the operation mode includes copy processing and individual print processing (e.g., network print).

The print counter 542 has print counters 5421, 5422, 5423 associated with the print mode that is the default value in order to store the number of prints the print speed of which is the "default value (same scale)" for each print mode and each operation mode. For example, the print counter 5421 counts and stores the number of prints in the copy processing by the "full color" print the print speed of which is the default value (same scale) and the number of prints in the individual print processing by the "full color" print the print speed of which is the default value (same scale). Moreover, the print counter 5422 counts and stores the number of prints in the copy processing by the "twin color" print the print speed of which is the same scale speed and the number of prints in the print processing by the "twin color" print the print speed of which is the same scale speed. Moreover, the print counter 5423 counts and stores the number of prints in the copy processing by the "black" print the print speed of which is the same scale speed and the number of prints in the print processing by the "black" print the print speed of which is the same scale speed.

In addition, the print counter 542 has print counters 5424, 5425, 5426 associated with the print mode of "1.5×" in order to count and store the number of prints the print speed of which is "1.5×" for each print mode and each operation mode. For example, the print counter 5424 counts and stores the number of prints in the copy processing by the "full color" print the print speed of which is 1.5× speed and the number of prints in the individual print processing by the "full color" print the print speed of which is 1.5× speed. Moreover, the print counter 5425 counts and stores the number of prints in the copy processing by the "twin color" print the print speed of which is 1.5× speed and the number of prints in the print processing by the "twin color" print the print speed of which is 1.5 times. The print counter 5426 counts and stores the number of prints in the copy processing by the "black" print the print speed of which is 1.5× speed and the number of prints in the print processing by the "black" print the print speed of which is 1.5 times.

In addition, the print counter 542 has print counters 5427, 5428, 5429 associated with the print mode of the "2×" in order to count and store the number of prints the print speed of which is the "2×" for each print mode and each operation mode. For example, the print counter 5427 counts and stores the number of prints in the copy processing by the "full color" print the print speed of which is 2× speed and the number of prints in the individual print processing by the "full color" print the print speed of which is 2× speed. Moreover, the print counter 5428 counts and stores the number of prints in the copy processing by the "twin color" print the print speed of which is 2× speed and the number of prints in the print processing by the "twin color" print the print speed of which is 2× speed. The print counter 5429 counts and stores the number of prints in the copy processing by the "black" print the print speed of which is 2× speed and the number of prints in the print processing by the "black" print the print speed of which is 2× speed.

In accordance with the print counter 542 as shown in FIG. 5, the number of prints at each print speed can be counted. Moreover, in accordance with the print counter 542, the number of prints at each print speed can also be counted for each print mode. Moreover, in accordance with the print counter 542, the number of prints in the copy processing and the number of prints in the individual print processing can also be counted for each print speed. In addition, in accordance with the print counter 542 shown in FIG. 5, the number of prints corresponding to the size of the printed images can also be counted.

Figure 6:
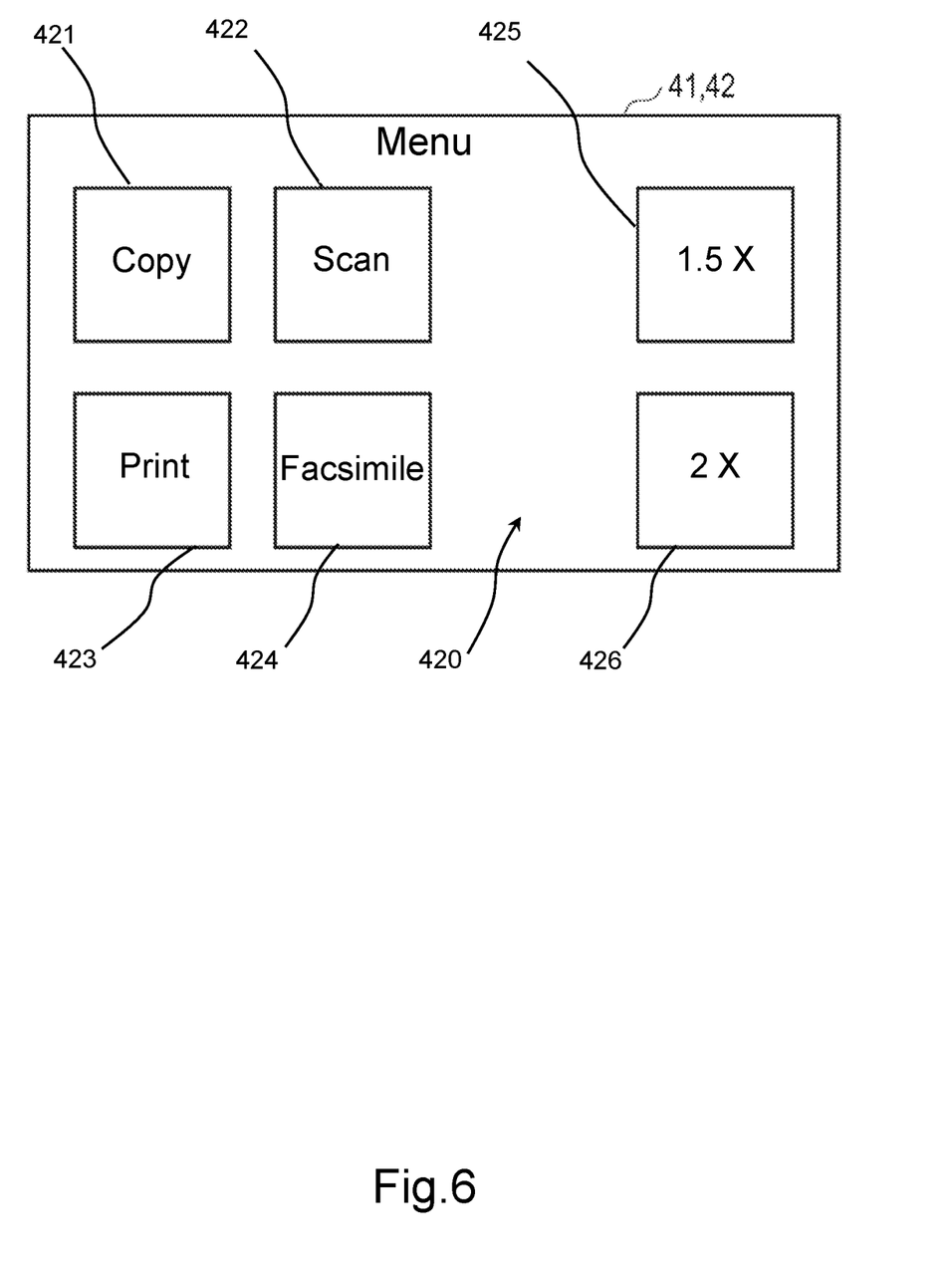
FIG. 6 is a diagram showing an example of an operation screen that displays the digital multifunction peripheral serving as the image reading apparatus and the image forming apparatus according to the embodiment.

Next, an instruction to set (change) the operating speed for the image reading apparatus and the digital multifunction peripheral 1 serving as the image forming apparatus according to the embodiment will be described. FIG. 6 is a display example of a menu screen 420 displayed on the display device 41 in the operation panel 4 of the digital multifunction peripheral 1. In the display example shown in FIG. 6, the display device 41 displays operation instruction buttons and an operating speed setting button that are capable of being operated on the touch panel 42. In a display example shown in FIG. 6, the display device 41 displays buttons 421, 422, 423, 424, "copy", "scan", "print", and "facsimile" as the operation instruction buttons.

The "copy" button 421 is a button that receives an operation for instructing to execute copy processing of printing document images read by using the scanner 2 on paper sheets through the printer 3. The "scan" button 422 is a button that receives an operation of instructing to execute scan processing of reading document images through the scanner 2. The "print" button 423 is a button that receives an operation for instructing to execute the print processing of printing the images on the paper sheets through the printer 3. The "facsimile" button 424 is a button that receives an operation for instructing to execute processing of sending a fax of the document images read by using the scanner 2 via the communication I/F 55 and the like as facsimile data.

Moreover, in the display example shown in FIG. 6, the buttons 425, 426, "1.5×" and "2×", are displayed as buttons that receive operations for instructing to set the operating speed. The "1.5×" button 425 is a button that receives an operation of instructing to set the scan operation and the print operating speed to 1.5× speed. The "2×" button 426 is a button that receives an operation of instructing to set the scan operation and the print operating speed to 2× speed. For example, when an instruction to execute scan processing (scan job) is made by operating the "scan" button 422 in a state in which an instruction (selection) to set the operating speed that is 1.5× speed has been made by operating the "1.5×" button 425, the processor 50 sets the scan speed to be 1.5 times the default value and performs the scan processing. Moreover, when an instruction to execute copy processing is made by operating the "copy" button 421 in a state in which an instruction to set the operating speed that is 2× speed has been made by operating the "2×" button 426, the processor 50 sets the scan speed and the print speed to be twice the default value and performs the copy processing.

Figure 7:
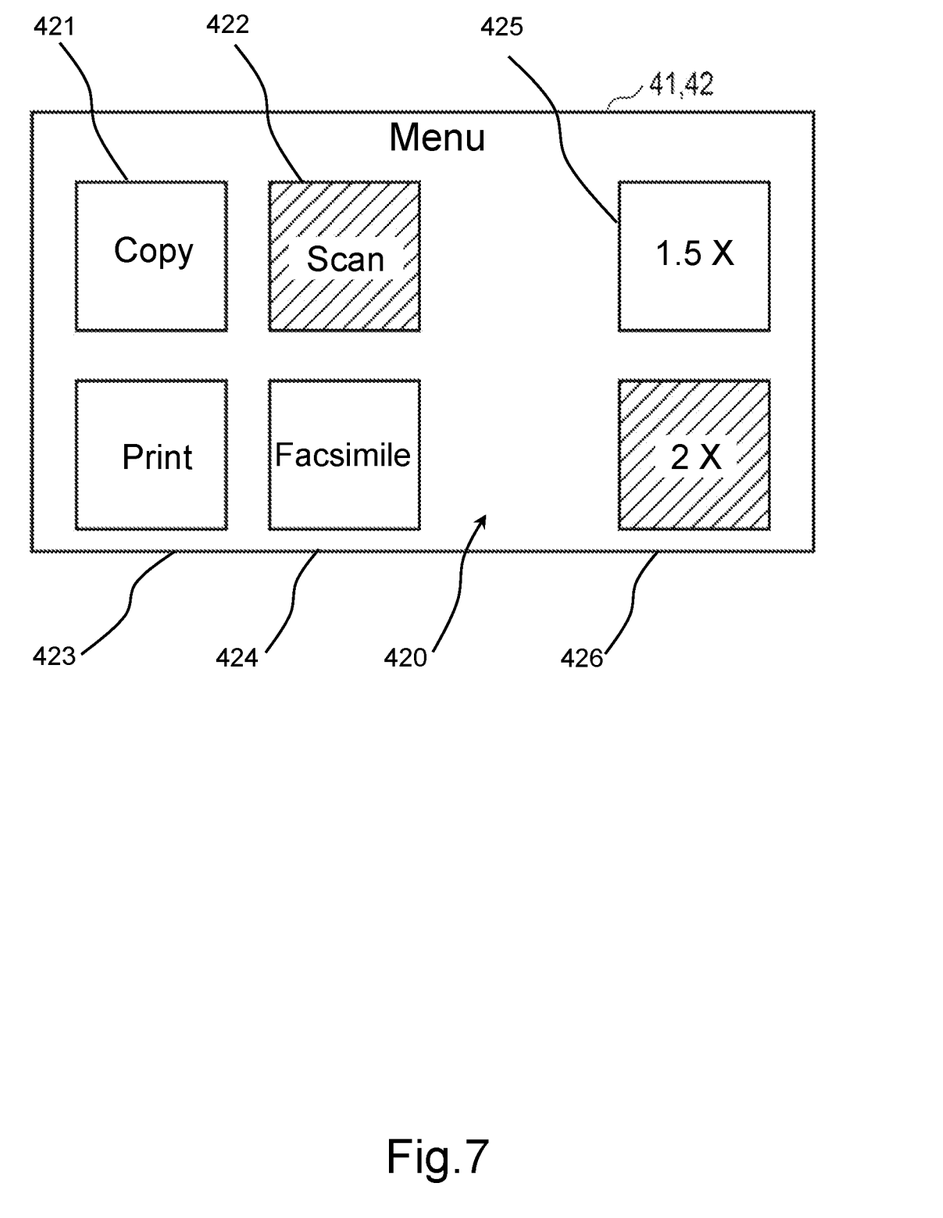
FIG. 7 is a diagram showing an example of an operation screen that displays the digital multifunction peripheral serving as the image reading apparatus and the image forming apparatus according to the embodiment.

FIG. 7 is a diagram showing a display example in a case where the instruction to change the operating speed has been made on the menu screen 420 displayed by the display device 41. In the display example shown in FIG. 7, an instruction to execute scan processing is made by operating the "scan" button 422 in a state in which an instruction (selection) to set the operating speed that is 2× speed has been made by operating the "2×" button 426. That is, for instructing to execute scan processing at the operating speed that is twice the default value, the user instructs to execute the scan processing by operating the "scan" button 422 in a state in which an instruction (selection) to set the operating speed that is 2× speed has been made by operating the "2×" button 426. When an instruction to execute scan processing is made by operating the "scan" button 422 in a state in which an instruction (selection) to set the operating speed that is 2× speed has been made by operating the "2×" button 426, the processor 50 sets the scan speed to be twice the default value (2× speed) and executes the scan processing (scan job).

Moreover, for instructing to execute copy at the operating speed that is "2×" or "1.5×", the user only needs to make an instruction of the copy processing by operating the "copy" button 421 in a state in which an instruction (selection) to set the operating speed has been made by operating the "2×" or "1.5×" button 425, 426. That is, the processor 50 receives an instruction to execute a job such as scanning and copying in a state in which an instruction to set the operating speed (change) has been made. Accordingly, the processor 50 executes the scan processing (scan job) or the copy processing (copy job) at the designated operating speed.

Figure 8:
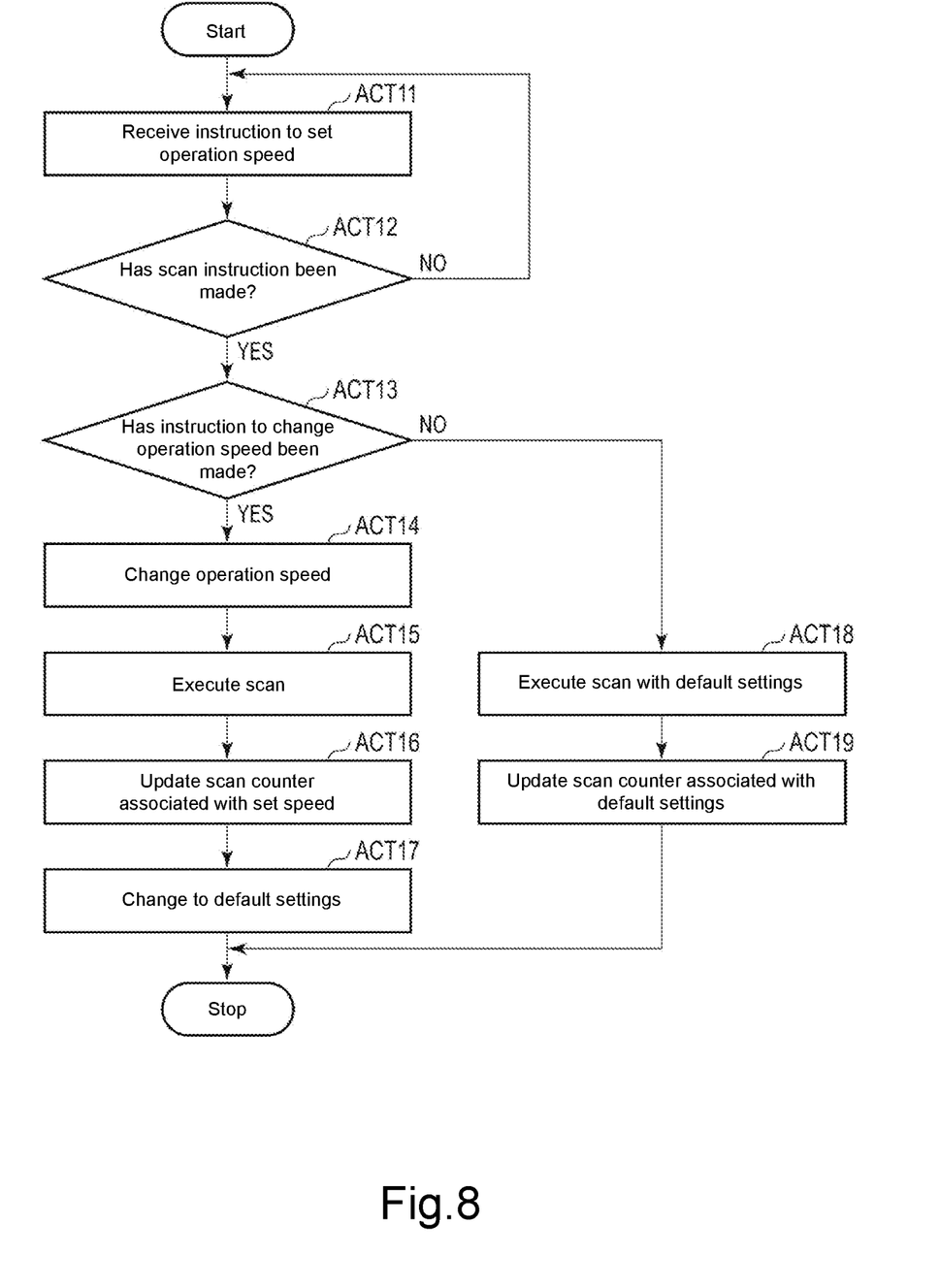
FIG. 8 is a flowchart showing an operation example of scan processing in the digital multifunction peripheral serving as the image reading apparatus according to the embodiment.

Next, a scan operation performed by the digital multifunction peripheral 1 serving as the image reading apparatus according to the embodiment will be described. FIG. 8 is a flowchart showing the scan operation performed by the digital multifunction peripheral 1 serving as the image reading apparatus according to the embodiment. In ACT 11, the processor 50 of the system controller 5 receives, during standby, various operation instructions and operating speed setting instructions. For example, the processor 50 causes the display device 41 of the operation panel 4 to display the menu screen 420 for inputting the various operation instructions and operating speed setting instructions. After the user instructs to set the operating speed in accordance with the menu screen 420, the user makes an instruction of processing to be executed (e.g., scan or copy).

In ACT 12, the processor 50 determines whether or not an instruction to execute the scan processing has been made. In a case where the instruction to execute the scan processing has been made (YES in ACT12), the processing of the processor 50 shifts to ACT13. In ACT 13, the processor 50 determines whether or not the instruction to change the operating speed has been made. In a case where the instruction to change the operating speed has been made (YES in ACT13), the processing of the processor 50 shifts to ACT14. In ACT 14, the processor 50 sets the scan speed to the designated operating speed.

For example, when the "scan" button 422 is operated, in a state in which the "1.5×" button 425 is operated for instruction, the processor 50 sets the operating speed (scan speed) to be 1.5 times the default value (1.5× speed). Moreover, when the "scan" button 422 is operated in a state in which the "2×" button 426 has been operated, the processor 50 sets the scan speed to be twice the default value (2× speed).

For example, for reading a document set on the ADF, the processor 50 changes the ADF's paper feeding speed of the document, a pixel data acquiring timing of the photoelectric conversion device 13, and the like in accordance with the designated scan speed. Moreover, for reading the document on the document table, the processor 50 changes a carriage moving speed of the moving mechanism 63, the pixel data acquiring timing of the photoelectric conversion device 13, and the like in accordance with the designated scan speed.

After the operating speed is changed, in ACT 15, the processor 50 executes the scan processing (scan job) of the document using the scanner 2 at the set operating speed. In ACT 16, every time an image of a document is read for one page during execution of the scan job, the processor 50 updates (counts up) the scan counter associated with the scan mode of the set (changed) scan speed (any one counter of the counters 5414 to 5419). For example, in a case where the color (full color) image has been scanned at 1.5× speed, the processor 50 counts up the counter 5414 associated with the 1.5× full color scan. Moreover, in a case where a black and white (black) image has been scanned at 2× speed, the processor 50 counts up the counter 5419 associated with the 2× black scan.

When the scan job ends, in ACT 17, the processor 50 changes setting of the operating speed to be the default value. Accordingly, after the scan job has been executed at the operating speed designated by the user, the digital multifunction peripheral 1 is capable of returning the operating speed to the default value. It should be noted that in a case where a predetermined time has elapsed after the scan job ends, the processor 50 may change setting of the operating speed to the default value.

Moreover, in a case where the instruction to change the operating speed has not been made (NO in ACT13), the processing of the processor 50 shifts to ACT18. In ACT 18, the processor 50 does not change the default setting value and performs the scan processing. In ACT 19, for executing the scan processing with the default value, the processor 50 counts up the scan counter associated with the scan mode that is the default value (any one counter of the counters 5411 to 5413) every time an image of a document is read for one page.

As described above, the digital multifunction peripheral serving as the image reading apparatus according to the embodiment receives an instruction to change the scan speed before scanning. In a case where an instruction to change the scan speed has been made, the digital multifunction peripheral changes the scan speed in accordance with the designated operating speed. The digital multifunction peripheral counts the number of scans for each scan speed during execution of the scan job.

Accordingly, the digital multifunction peripheral serving as the image reading apparatus is capable of changing the scan speed in accordance with the user's instruction and managing the number of scans at each operating speed. As a result, in the digital multifunction peripheral serving as the image reading apparatus, an operation to charge a price for the use depending on the scan speed and the number of scans can be performed.

Although the above-mentioned operation example has been described assuming the scan operation, the digital multifunction peripheral 1 may make the operating speed variable (accelerate) also for scan operations in fax sending and the like. Also in this case, the digital multifunction peripheral counts the number of scans for each operating speed through the scan counter. Accordingly, the scan speed in fax processing can also be changed, and the number of scans can be counted for each scan speed. Moreover, in a case where an instruction to accelerate the fax processing has been made, the digital multifunction peripheral 1 may accelerate the data processing for conversion into fax data. For example, the digital multifunction peripheral may accelerate the data processing by increasing the operating frequency of the processor that executes the data processing of converting a scan image into fax data.

Figure 9:
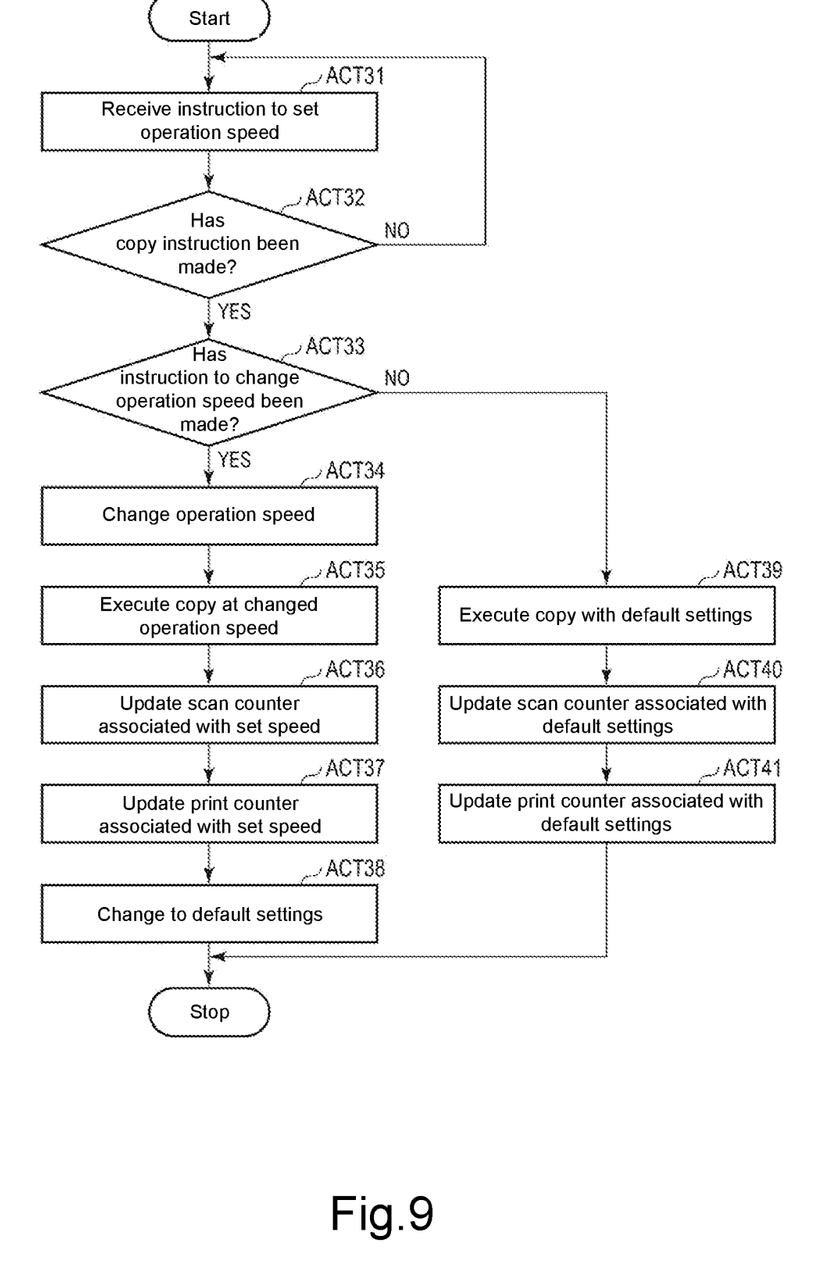
FIG. 9 is a flowchart showing an operation example of copy processing in the digital multifunction peripheral serving as the image forming apparatus according to the embodiment.

Next, a copy operation in the digital multifunction peripheral 1 serving as the image forming apparatus according to the embodiment will be described. FIG. 9 is a flowchart showing the copy operation in the digital multifunction peripheral 1 serving as the image forming apparatus according to the embodiment. In ACT 31, the processor 50 of the system controller 5 receives, during standby, various operation instructions and operating speed setting instructions. For example, the processor 50 causes the display device 41 of the operation panel 4 to display the menu screen 420 for inputting the various operation instructions and operating speed setting instructions. The user who wishes to copy at higher speed than the default value instructs to set the operating speed in accordance with the menu screen 420 and instructs to execute the copy.

In ACT 32, the processor 50 determines whether or not an instruction to execute the copy processing has been made. In a case where the instruction to execute the copy processing has been made (YES in ACT32), the processing of the processor 50 shifts to ACT33. In ACT 33, the processor 50 determines whether or not an instruction to change the operating speed has been made. In a case where the instruction to change the operating speed has been made (YES in ACT33), the processing of the processor 50 shifts to ACT34.

In ACT 34, the processor 50 sets the scan speed and the print speed (copy speed) to be the designated operating speed. Here, it is assumed that the copy operating speed (copy speed) is realized by changing the scan speed and the print speed from the default value.

For example, when the "copy" button 421 is operated in a state in which the "1.5×" button 425 has been operated, the processor 50 sets the scan speed and the print speed to be 1.5 times the default value (1.5× speed). Moreover, when the "copy" button 421 is operated in a state in which the "2×" button 426 has been operated, the processor 50 sets the scan speed and the print speed to be twice the default value (2× speed). Moreover, in the copy, image processing and the like of converting images read by the scanner 2 into image data for printing are also performed. In order to reduce the time required for image processing in the copy, the processor 50 may set (change) the operating frequency of the processor that performs the image processing in accordance with the designated operating speed.

After the operating speed is changed, in ACT 35, the processor 50 executes the copy processing (copy job) at the set operating speed. During execution of the copy job, every time an image of a document is read for one page, in ACT 36, the processor 50 updates (counts up) the scan counter (any one counter of the counters 5414 to 5419) at the set (changed) scan speed corresponding to the scan mode.

Moreover, in ACT 37, every time an image for one page is printed on a paper sheet during execution of the copy job, the processor 50 counts up updates the print counter (any one counter of the counters 5424 to 5429) at the set print speed corresponding to the print mode.

For example, for executing the color (full color) copy at 1.5× speed, the processor 50 counts up the scan counter 5414 associated with the 1.5× full color scan. Moreover, for executing the color copy at 1.5× speed, the processor 50 counts up the print counter 5424 associated with the 1.5× full color print. Moreover, for executing the black and white (black) copy at 2× speed, the processor 50 counts up the scan counter 5419 associated with the 2× black scan and counts up the print counter 5429 associated with the 2× black print.

When the copy job ends, in ACT 37, the processor 50 changes setting of the operating speed to be the default value. Accordingly, when the copy job at the operating speed designated by the user ends, the digital multifunction peripheral 1 is capable of returning the setting value of the operating speed to the default setting value. It should be noted that in a case where a predetermined time has elapsed after the copy job ends, the processor 50 may change (return) setting of the operating speed to the default value.

Moreover, in a case where the instruction to change the operating speed has not been made (NO in ACT33), the processing of the processor 50 shifts to ACT39. In ACT 39, the processor 50 does not change the default setting value and performs the scan processing. In a case of performing the copy processing with the default value, in ACT 40, the processor 50 counts up the scan counter associated with the scan mode that is the default value (any one counter of the counters 5411 to 5413) every time an image of a document is read for one page. In addition, the processor 50 updates the print counter (any one counter of the counters 5421 to 5423) associated with the print mode that is the default value every time an image of a document for one page is printed on a paper sheet.

As described above, the digital multifunction peripheral serving as serving as the image forming apparatus according to the embodiment receives an instruction to change the copy speed before the copy is executed. In a case where the instruction to change the copy speed has been made, the digital multifunction peripheral changes the operating speed including the scan speed and the print speed in accordance with the designated operating speed. For executing the copy, the digital multifunction peripheral counts the number of scans and the number of prints at each operating speed.

Accordingly, a digital multifunction peripheral serving as the image forming apparatus is capable of changing the copy speed in accordance with the user's instruction and managing the number of scans and the number of prints at each operating speed. As a result, in the digital multifunction peripheral serving as the image forming apparatus, an operation to charge a price for the use depending on the operating speed for the number of scans and the number of prints can be performed.

It should be noted that for the digital multifunction peripheral according to the embodiment, an administrator may set the operating speed. In this case, the digital multifunction peripheral during operation (after shipment) is capable of setting the operating speed (scan speed, print speed) for the scan speed and the print speed in accordance with the administrator's instruction. For example, in a case where the administrator has instructed to set the operating speed (scan speed, print speed) to be N times the operating speed, the digital multifunction peripheral sets the operating speed to be N times the default value as the administrator has instructed. In this case, the digital multifunction peripheral may keep the operating speed N times the default value until the digital multifunction peripheral receives an instruction to return the operation setting to the default value from the administrator.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
    a scanner that reads an image of a document at a set scan speed;
    a printer that prints an image on a paper sheet at a set print speed;
    an operation panel that inputs an operating speed of a copy job using the scanner and the printer;
    a storage device that includes
        a scan counter that stores, for each scan speed, a count value of the number of pages of the image read by using the scanner, and
        a print counter that stores, for each print speed, a count value of the number of pages of the image printed on the paper sheet by using the printer; and
    a processor configured to
        set a scan speed and a print speed corresponding to the operating speed input by the operation panel,
        execute the copy job at the set scan speed and print speed, and
        update the scan counter in accordance with the number of pages of the image read at the set scan speed and update the print counter in accordance with the number of pages of the image printed on the paper sheet at the set print speed.

2. The image forming apparatus according to claim 1, wherein
    the scanner has a plurality of scan modes for reading the image of the document,
    the printer has a plurality of print modes for printing the image on the paper sheet,
    the scan counter stores the count value for each scan mode and each scan speed, and
    the print counter stores the count value for each print mode and each print speed.

3. The image forming apparatus according to claim 1, wherein
    the operation panel that inputs an instruction to accelerate the copy job, and
    in a case where the operation panel inputs the instruction to accelerate the copy job, the processor sets the scan speed and the print speed to be higher than a default value in accordance with contents of the instruction input by the operation panel.

4. The image forming apparatus according to claim 1, wherein
    the operation panel further includes
        a scan button that inputs an execution instruction of a scan job of reading the image of the document by using the scanner,
        a copy button that inputs an execution instruction of the copy job, and
        a speed setting button that inputs an instruction to accelerate the job, and
    a processor
        in a case where the speed setting button inputs the instruction to accelerate the job in a state in which the scan button inputs the execution instruction of the scan job,
        sets a scan speed corresponding to the operating speed input by the operation panel,
        executes the scan job at the set scan speed,
        updates the scan counter in accordance with the number of pages of the image read at the set scan speed,
        sets the scan speed to be higher than a default value in accordance with contents of the instruction input by the speed setting button,
        executes the scan job at the set scan speed, and
        updates the scan counter in accordance with the number of pages of the image read at the set scan speed, and
        in a case where the speed setting button inputs the instruction to accelerate the job in a state in which the copy button inputs the execution instruction of the copy job,
        sets the scan speed and the print speed to be higher than a default value in accordance with contents of the instruction input by the speed setting button.

* * * * *